(12) United States Patent
Nakagawa et al.

(10) Patent No.: US 8,051,321 B2
(45) Date of Patent: Nov. 1, 2011

(54) CLUSTER SYSTEM AND NODE SWITCHING METHOD

(75) Inventors: Jun Nakagawa, Kawasaki (JP); Takahiro Kojima, Kawasaki (JP); Ryuji Maruyama, Kawasaki (JP); Shinji Yamauchi, Kawasaki (JP); Keiji Sakai, Kanazawa (JP)

(73) Assignee: Fujitsu Limitd, Kawasaki (JP)

( * ) Notice: Subject to any disclaimer, the term of this patent is extended or adjusted under 35 U.S.C. 154(b) by 0 days.

(21) Appl. No.: 12/547,106

(22) Filed: Aug. 25, 2009

(65) Prior Publication Data

US 2010/0017646 A1 Jan. 21, 2010

Related U.S. Application Data

(63) Continuation of application No. PCT/JP2007/000147, filed on Feb. 28, 2007.

(51) Int. Cl.
*G06F 11/00* (2006.01)
(52) U.S. Cl. ........................................................ 714/4.1
(58) Field of Classification Search .................. None
See application file for complete search history.

(56) References Cited

U.S. PATENT DOCUMENTS

| | | | |
|---|---|---|---|
| 6,910,078 B1 * | 6/2005 | Raman et al. | 709/231 |
| 7,827,262 B2 * | 11/2010 | Weis | 709/223 |
| 2003/0014480 A1 * | 1/2003 | Pullara et al. | 709/203 |
| 2003/0126200 A1 * | 7/2003 | Wolff | 709/203 |
| 2004/0153709 A1 * | 8/2004 | Burton-Krahn | 714/4 |
| 2005/0257258 A1 | 11/2005 | Kinoshita et al. | |
| 2007/0168500 A1 * | 7/2007 | D'Souza et al. | 709/224 |

FOREIGN PATENT DOCUMENTS

| | | |
|---|---|---|
| JP | A 4-141744 | 5/1992 |
| JP | A 5-75637 | 3/1993 |
| JP | A 9-34852 | 2/1997 |
| JP | A 9-293059 | 11/1997 |
| JP | 2000-330814 | 11/2000 |
| JP | A 2000-330814 | 11/2000 |
| JP | A 2004-334534 | 11/2004 |
| JP | 2005-327137 | 11/2005 |
| JP | 2006-285532 | 10/2006 |

OTHER PUBLICATIONS

Japanese Patent Office; Notice of Rejection Ground for corresponding JP Application No. 2009-501033; mailed Mar. 2, 2010.
Notice of Rejection Ground issued by the Japanese Patent Office for Japanese Patent Application No. 2009-501033, mailed Jun. 8, 2010 (with English language translation).
Notice of Rejection Ground issued by the Japanese Patent Office for Japanese Patent Application No. 2009-501033, mailed Oct. 26, 2010 (with English language translation).

* cited by examiner

*Primary Examiner* — Christopher McCarthy
(74) *Attorney, Agent, or Firm* — Greer, Burns & Crain, Ltd.

(57) ABSTRACT

When a first server node fails in a cluster system, a client node device transmits failure detection information to a second server node device. Upon receipt of the failure detection information, the second server node device transmits a survival confirmation request to the first server node device. When receiving no survival confirmation response from the first server node device, the second server node device determines that the first server node device has failed and starts the switching control of a server node device which performs a service process. Upon receipt of failure detection information, the second server node device starts switching control when further receiving failure detection information from another client node device.

5 Claims, 28 Drawing Sheets

CONFIGURATION INFORMATION
NODE GROUP X
| NODE | SERVICE A1 | SERVICE B |
|------|------------|-----------|
| N1 | Active | Standby2 |
| N2 | Standby1 | Active |
| N3 | Standby2 | Standby1 |
NODE GROUP Z
| NODE | SERVICE A2 | SERVICE C |
|------|------------|-----------|
| N4 | Active | Standby2 |
| N5 | Standby1 | Active |
| N6 | Standby2 | Standby1 |
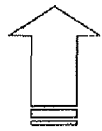
CONFIGURATION INFORMATION
NODE GROUP X
| NODE | SERVICE A | SERVICE B | SERVICE C |
|------|-----------|-----------|-----------|
| N1 | Active | Standby2 | Standby1 |
| N2 | Standby1 | Active | Standby2 |
| N3 | Standby2 | Standby1 | Active |
F I G. 5

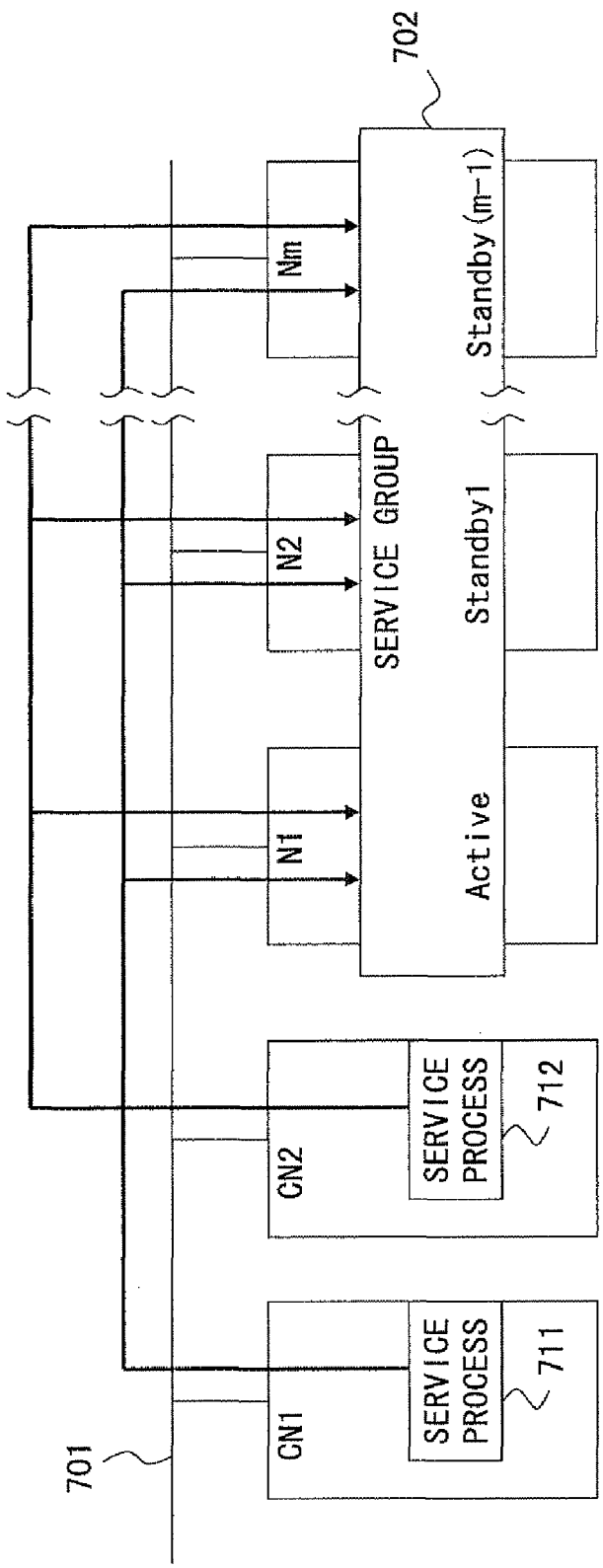
F I G. 7

| SERVICE GROUP ID | TIMER TMR1 |
|---|---|
| A | 5 SECONDS |
| B | UNSET |

FIG. 10

| SERVICE GROUP ID | TIMER TMR2 |
|---|---|
| A | 5 SECONDS |
| B | UNSET |

F I G. 11

| SERVICE GROUP ID | FAILURE NODE ID | DETECTION SOURCE CLIENT NODE ID |
|---|---|---|
| A | N1 | CN1 |
| | | |

F I G. 1 2

| PACKET ID | SERVICE GROUP ID | SEQUENCE NO. | DATA | TRANSMITTING SOURCE NODE ID |

FIG. 13

| PACKET ID "ACK (RESPONSE)" | SERVICE GROUP ID | SEQUENCE NO. | RESPONSE NODE ID |
|---|---|---|---|

F I G. 14

| PACKET ID "SURVIVAL CONFIRMATION" | SERVICE GROUP ID | SEQUENCE NO. | CONFIRMATION REQUEST SOURCE NODE ID |
|---|---|---|---|

F I G. 1 5

| PACKET ID "SURVIVAL CONFIRMATION RESPONSE" | SERVICE GROUP ID | SEQUENCE NO. | RESPONSE NODE ID |
|---|---|---|---|

F I G. 1 6

| PACKET ID "NODE FAILURE DETECTION" | SERVICE GROUP ID | SEQUENCE NO. | DETECTION SOURCE NODE ID | FAILURE NODE ID |

FIG. 17

| SERVICE GROUP ID | FAILURE NODE ID |
|---|---|
| A | N1 |
|  |  |

FIG. 21

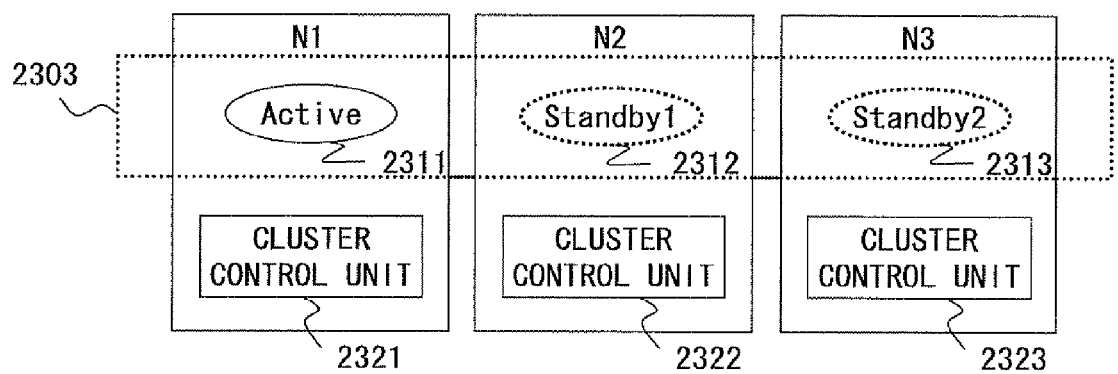
F I G. 23

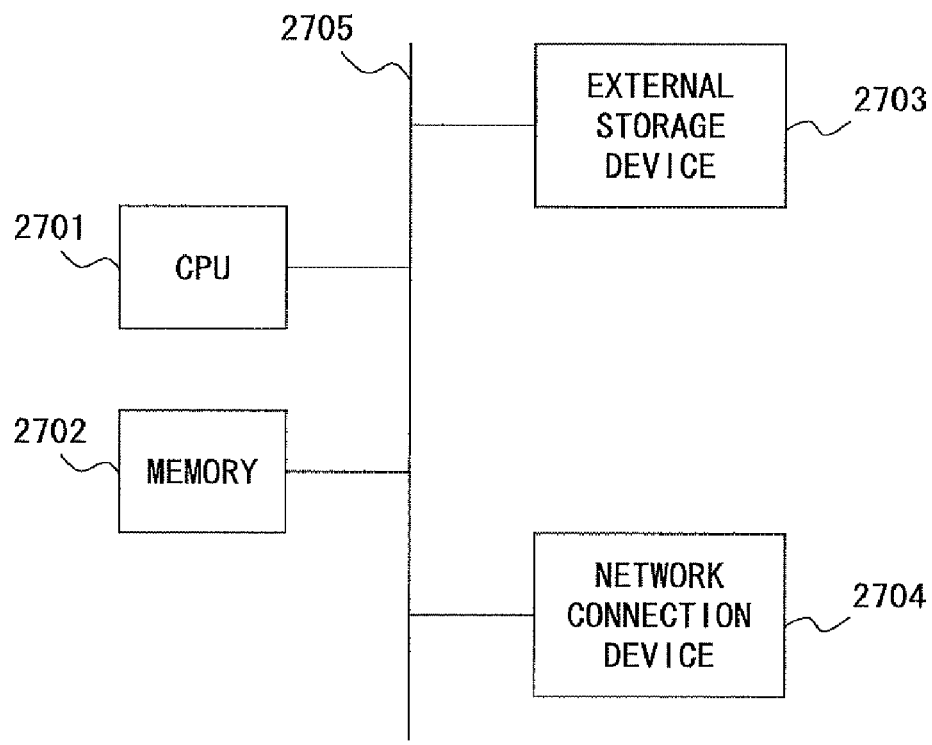
F I G. 27

CLUSTER SYSTEM AND NODE SWITCHING METHOD

CROSS-REFERENCE TO RELATED APPLICATIONS

This application is a continuation of International PCT application PCT/JP2007/000147 which was filed on Feb. 28, 2007.

FIELD

The present invention relates to a cluster system composed of a plurality of information processing devices (nodes) and a node switching method implemented when a failure is detected in a cluster system.

BACKGROUND

In a conventional cluster system composed of a plurality of service servers, generally a node failure detection method by a heart beat signal is adopted. In this method a heart beat packet is transmitted from each service server to other service servers via a dedicated interconnect LAN (local area network) and when no response packet is received from a specific service server for a certain time, the failure of the service server is detected.

However, the node failure detection method by a heart beat signal has the following problems.

(1) Misdetection

In a cluster system, even when a service process itself is normally performed, sometimes a heart beat signal is not normally transmitted/received due to the partial failure of an operating system (OS) and the like. In this case, the failure of a system state not directly related to a service is detected and even in a state where the service process can be actually continued, node switching occurs.

(2) Detection Time

The node failure detection method by a heart beat signal requires fairly much detection time. Then, if a timer is set short in order to shorten the detection time, the misdetection of (1) is promoted. Therefore, there is a high risk that unnecessary node switching occurs.

The following Patent document 1 relates to a cluster system for determining whether a process can be continued by using a service processor for monitoring failure occurrence in a node and Patent document 2 relates to a cluster system in which a management server collectively manages node information by an agent mounted on each node communicating with the management server.

Patent document 1: Japanese Laid-open Patent Publication No: 09-034852
Patent document 2: Japanese Laid-open Patent Publication No: 2004-334534

SUMMARY

It is an object of the present invention to prevent the occurrence of unnecessary node switching when a service process can be continued in a cluster system.

The first cluster system of the present invention includes a client node device and a plurality of server node devices. When a first server node device of the plurality of server node devices fails, the client server node device transmits failure detection information to a second server node device.

Upon receipt of the failure detection information, the second server node device transmits a survival confirmation request to the first server node device and when receiving no survival confirmation response from the first server node device, it determines that the first server node device has failed and starts switching control of a server node device which performs a service process.

According to such a cluster system, switching control is started after the second server node device being another node device confirms the failure of the first server node device detected by the client server device. Therefore, the failure of a server node device can be surely verified and unnecessary node switching can be suppressed.

The second cluster system of the present invention includes a plurality of client node devices and a plurality of server node devices. Each of the plurality of client node devices transmits a service process request to a first service server of the plurality of server node devices and receiving no service process response from the first server node device, it transmits failure detection information to a second service server.

When receiving the failure detection information from two or more client node devices, the second server node device determines that the first server node device has failed and it starts switching control of a server node device which performs a service process.

According to such a cluster system, since the failure of the first server node device is detected on the basis of whether there is a response to a service process request, a state in which a service cannot be continued can be directly detected. Furthermore, switching control is started after a plurality of client node devices detect the failure of the first server node device, the failure of a server node device can be surely verified and unnecessary node switching can be suppressed.

The client node device, the first server node device and the second server node device correspond to, for example, a client node CN1 or CN2, a node N1 and nodes N2-Nm, respectively, which will be described later.

BRIEF DESCRIPTION OF DRAWINGS

FIG. 5 illustrates the modification of configuration information by scale-out;
FIG. 7 illustrates a configuration of a cluster system including client nodes;
FIG. 10 illustrates a first timer management table;
FIG. 11 illustrates a second timer management table;
FIG. 12 illustrates a failed node list;
FIG. 13 illustrates a service packet;
FIG. 14 illustrates a service response packet;
FIG. 15 illustrates a survival confirmation packet;
FIG. 16 illustrates a survival confirmation response packet;
FIG. 17 illustrates a node failure detection packet.

FIG. 21 illustrates a node failure determination list;

FIG. 23 illustrates the switching in units of service group;

FIG. 27 illustrates a configuration of an information processing device; and

DESCRIPTION OF EMBODIMENTS

Preferred embodiments of the present invention will be explained in detail with reference to accompanying drawings.

Figure 1:
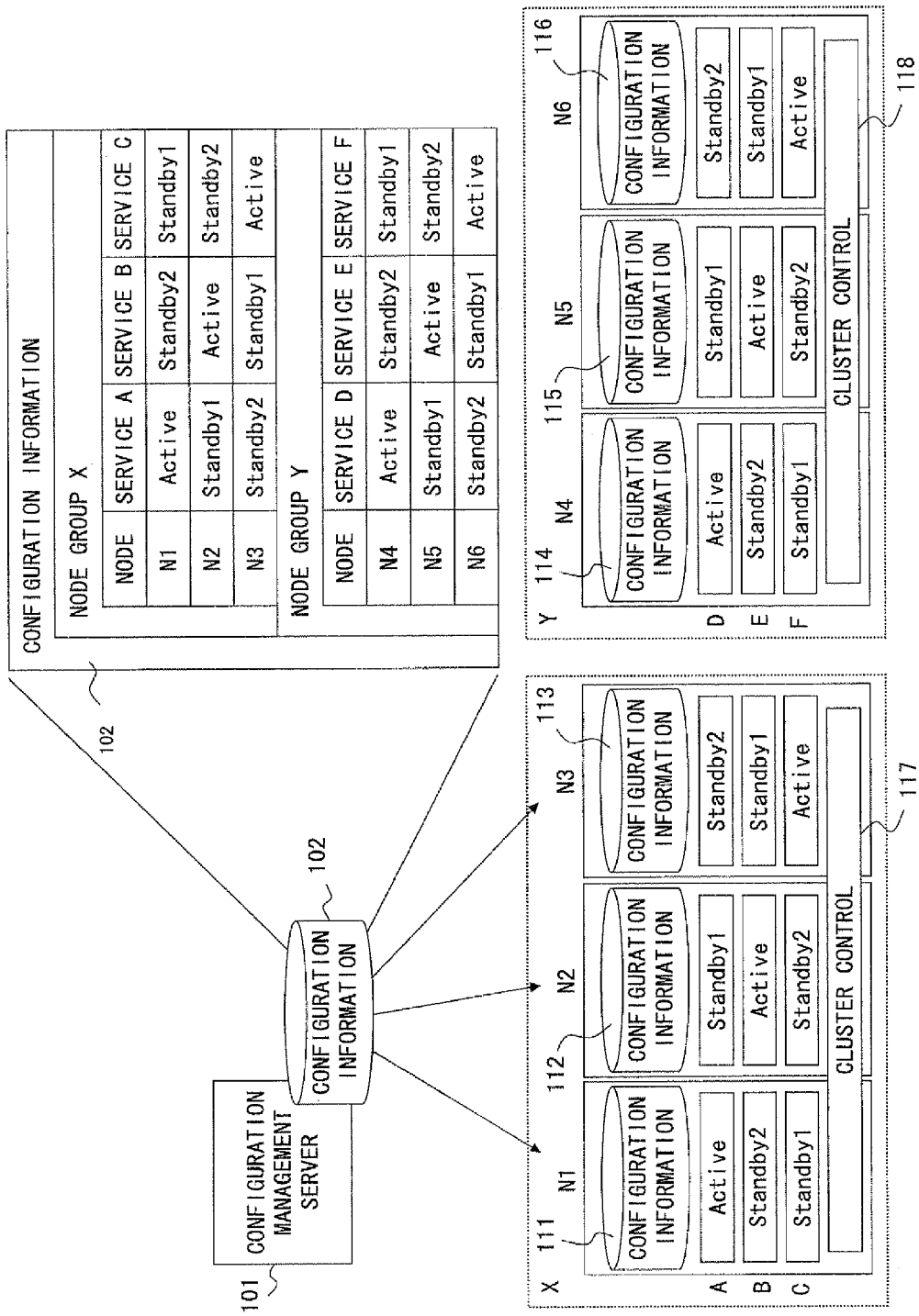
FIG. 1 illustrates a cluster system and configuration information.

FIG. 1 illustrates a configuration example of the cluster system in this preferred embodiment. This cluster system includes a configuration management server 101 and nodes (servers) N1-N6. Of these, a plurality of nodes being the switching control targets of the cluster system are managed as a node group and the capability improvement of the system can be realized by preparing a plurality of node groups. In this example, nodes N1-N3 belong to a node group X and nodes N4-N6 belong to a node group Y.

A plurality of elements, such as service processes constituting one service process is managed as a service group and a plurality of service groups can be performed in one node. Furthermore, one service group can be executed in a plurality of nodes. Of them, one node operates as a primary server and the others operate as secondary servers.

Although configuration information 102 referred to at the time of switching control is stored in the configuration management server 101 at the time of setting, it is distributed to each node group together with the starting instruction of a service process. The information of a plurality of nodes constituting each node group and the states (Active/Standby1/Standby2) of each execution unit of each service group are set in the configuration information 102.

Active indicates a state in which a request from a service client is received and a service process is actually performed and Standby 1 and Standby 2 indicate waiting states in which the service process is undertaken with the first and second priorities, respectively when an execution unit in an active state fails. Therefore, a node group indicates a plurality of nodes in which execution units in Active, Standby1 and Standby2 states which are switched to each other, exist.

Three service groups corresponding to services A through C are assigned to the node group X and of these, in the service group of a service A, the states of nodes N1, N2 and N3 are set to Active, Standby1 and Standby2, respectively. In the service group of a service B, the states of nodes N1, N2 and N3 are set to Standby2, Active and Standby1, respectively. In the service group of a service C, the states of nodes N1, N2 and N3 are set to Standby1, Standby2 and Active, respectively.

Three service groups corresponding to services D through F are assigned to the node group Y and of these, in the service group of a service D, the states of nodes N4, N5 and N6 are set to Active, Standby1 and Standby2, respectively. In the service group of a service E, the states of nodes N4, N5 and N6 are set to Standby2, Active and Standby1, respectively. In the service group of a service F, the states of nodes N4, N5 and N6 are set to Standby1, Standby2 and Active, respectively.

The configuration information 102 distributed to the node groups X and Y is stored in nodes N1 through N6 as configuration information 111 through 116, respectively. Nodes N1 through N3 perform cluster control 117 for managing the state of each execution unit in the service groups of services A through C and nodes N4 through N6 perform cluster control 118 for managing the state of each execution unit in the service groups of services D through F.

Figure 2:
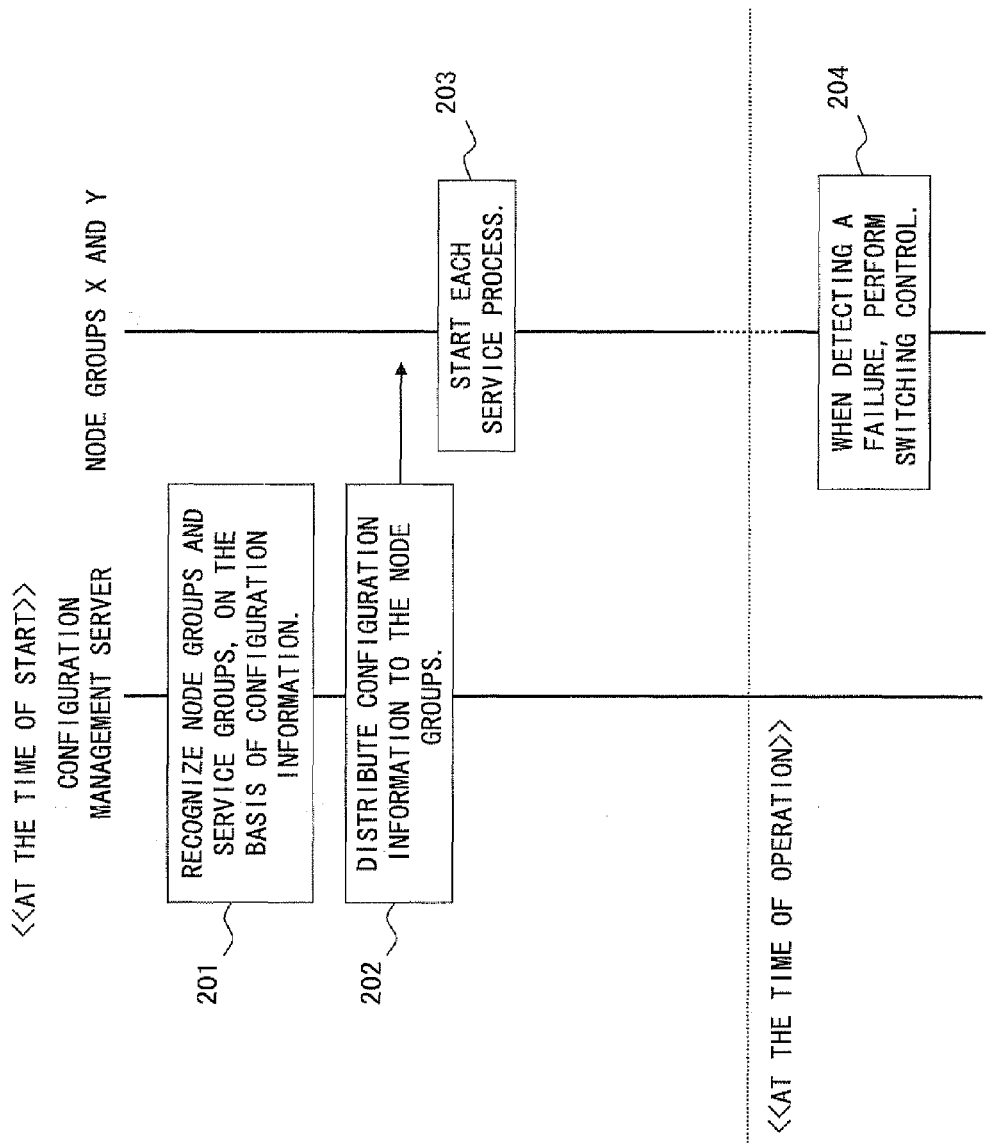
FIG. 2 is a flowchart of a process in a cluster system.

FIG. 2 is a flowchart of a process in the cluster system illustrated in FIG. 1.

Firstly, at the starting time of a service, the configuration management server 101 recognizes the configuration of node groups and service groups referring to preset configuration information 102 (step 201) and distributes the configuration information 102 to each node of each group together with the starting instruction of a service process (step 202).

The nodes N1 through N6 store the distributed configuration information 102 as configuration information 111 through 116 and start the process of each service referring to the configuration information 111 through 116 (step 203). Then, when detecting a failure during a service operation, each node group performs switching control according to the storing configuration information (step 204).

Figure 3:
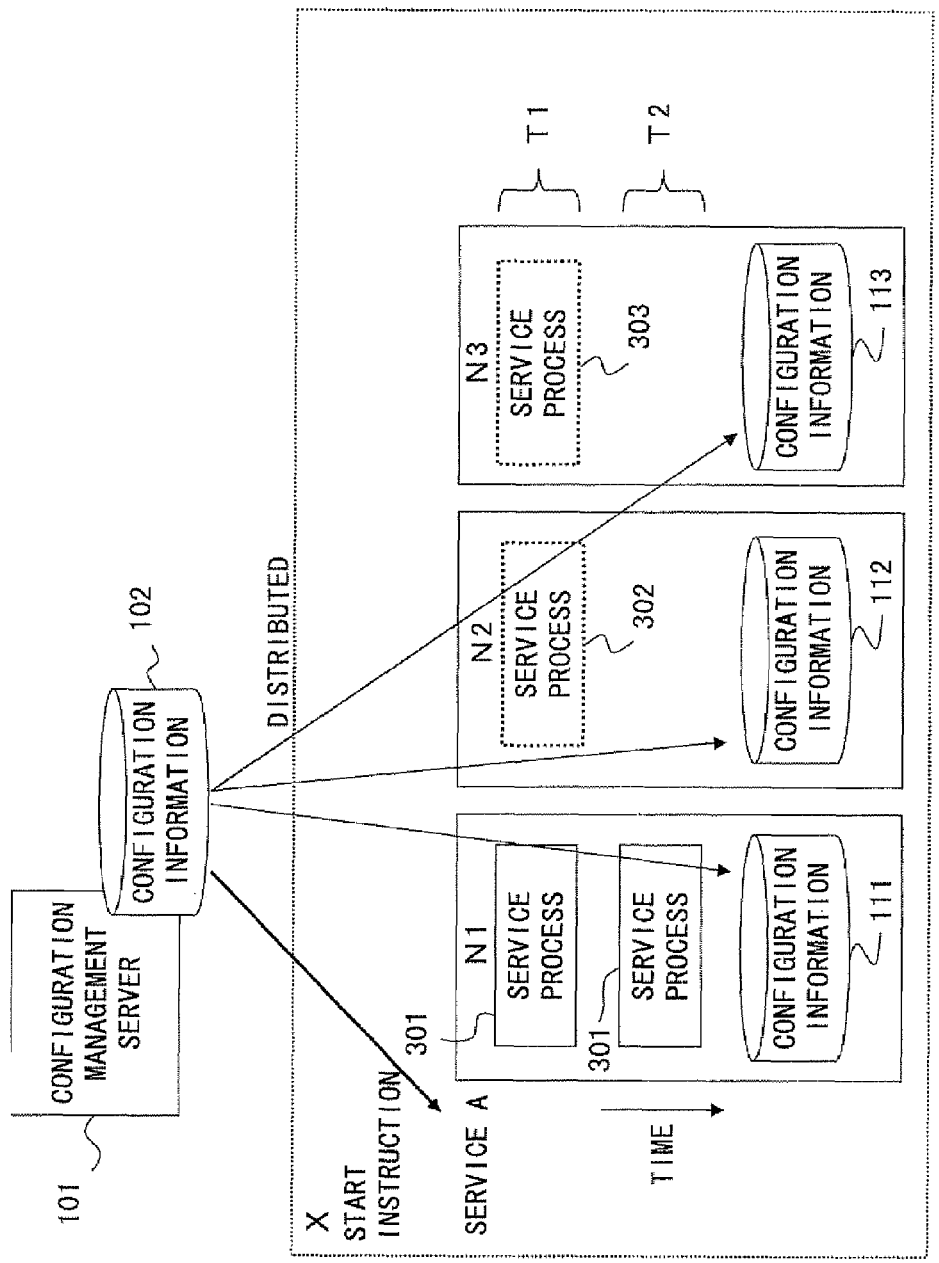
FIG. 3 illustrates a process at the starting time of a service.

FIG. 3 illustrates a process at the starting time of a service A. The node group X performs a standby process according to the configuration information 111 through 113 at a time T1. Thus, service processes 301 through 303 corresponding to the execution units of service A in the node N1 through N3 are set to Active, Standby1 and Standby2, respectively. Then, at a time T2, the node N1 performs the on-line process of the service process 301 in an active state and starts the operation of the service A.

Figure 4:
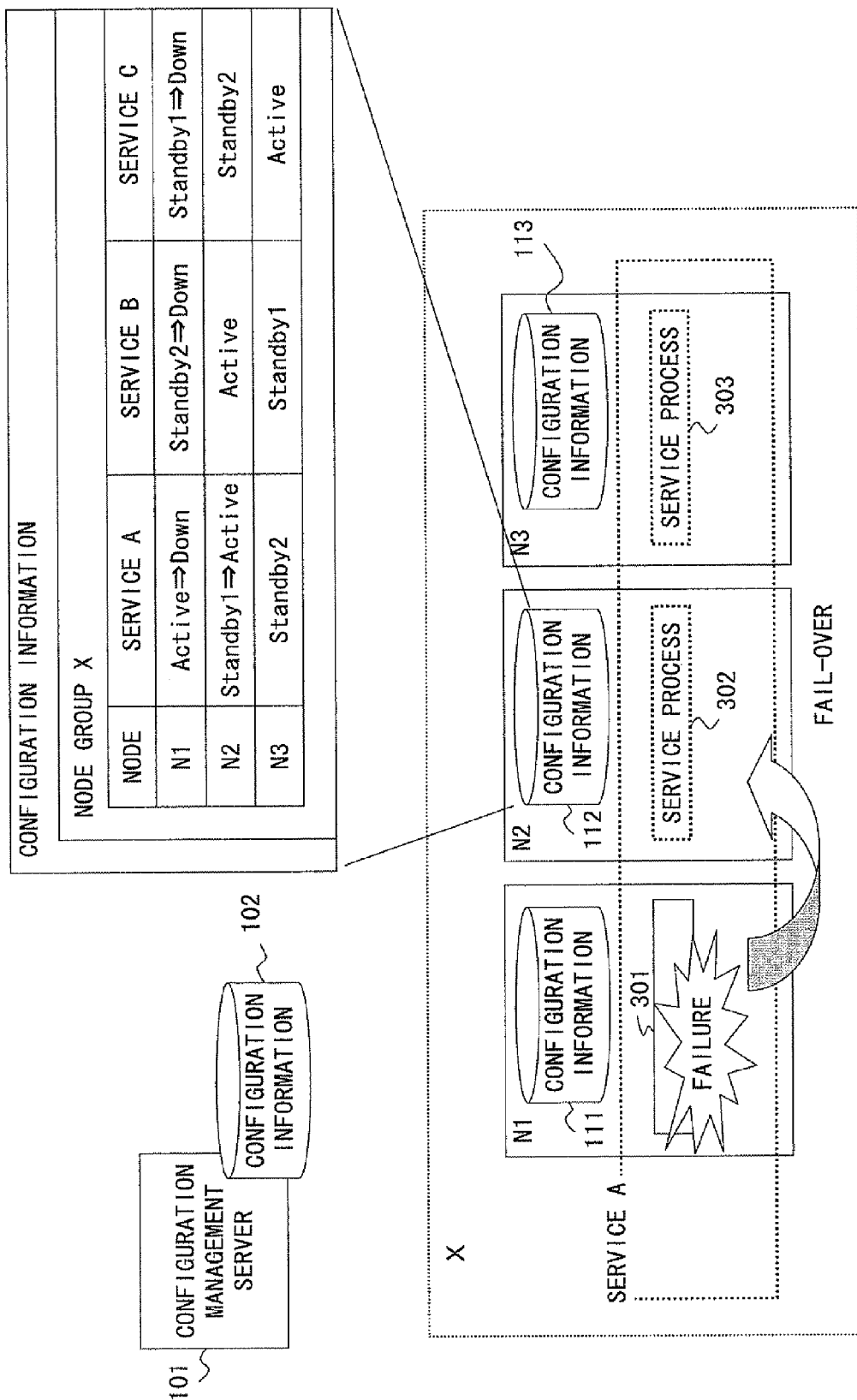
FIG. 4 illustrates fail-over control at the time of service operation.

Then, when the node N1 fails, as illustrated in FIG. 4, the node group X performs fail-over control and switches the operation of the service A from the service process 301 to a service process 302.

At this moment, the state of the service process 301 in configuration information 111 through 113 is modified from Active to Down and the state of the service process 302 is modified from Standby1 to Active. Furthermore, the states of the service processes of services B and C are modified to Down. Down indicates a node-failed state.

Thus the state of a node group during its service operation is recorded on configuration information in the node group and is managed. Therefore, after the configuration management server 101 goes down due to a failure or the like, switching control can be performed in the node group and a service operation maintaining high reliability can be continued.

Figure 6:
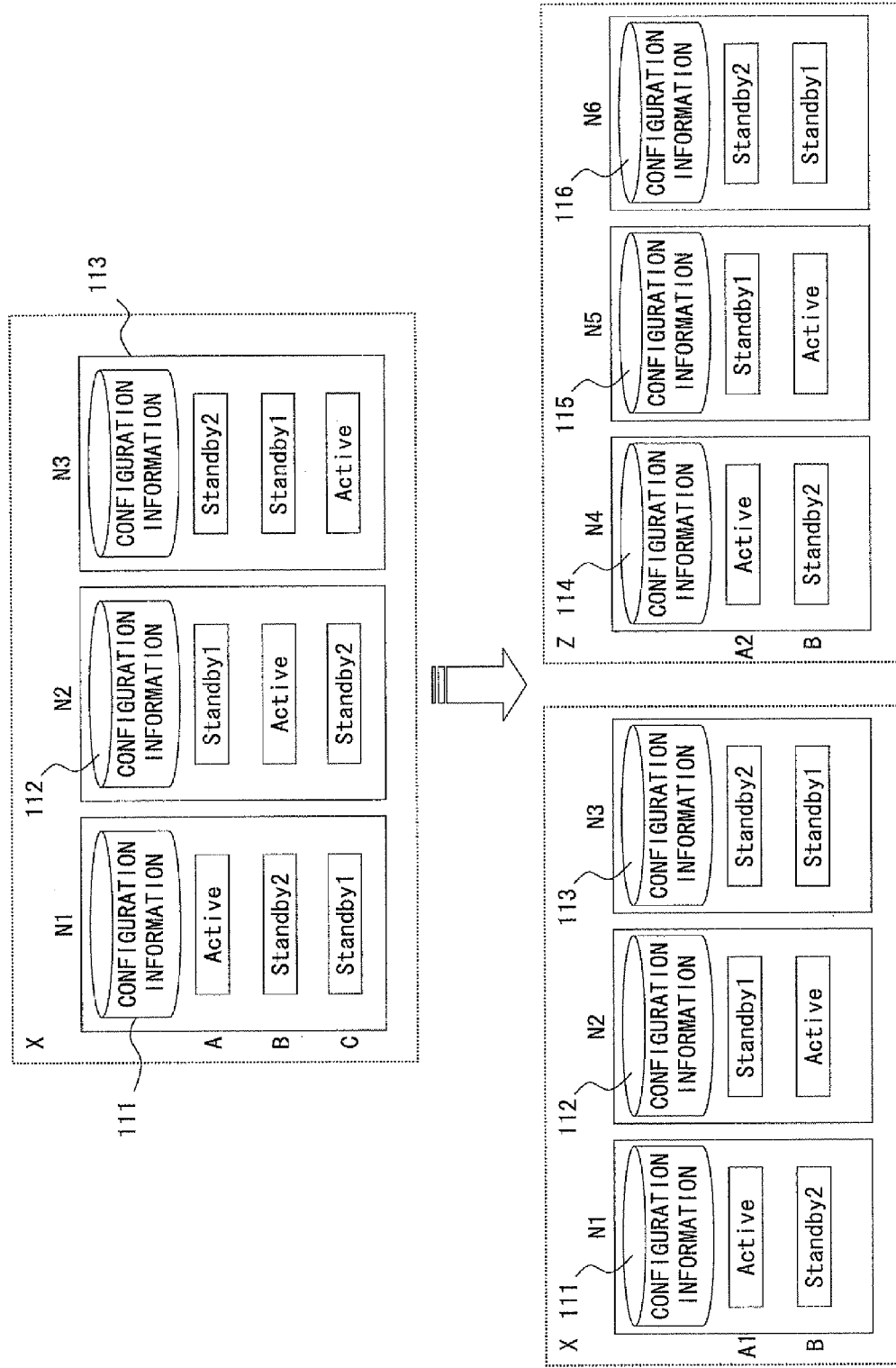
FIG. 6 illustrates the modification of a cluster system by scale-out.

However, in a cluster system, sometimes scale-out for increasing the number of nodes constituting the system is conducted accompanying the increase of the amount of process during the operation of a service A. In this case, the configuration information 102 of the configuration management server 101 is modified, for example, as illustrated in FIG. 5. As a result, the configuration of the cluster system is modified as illustrated in FIG. 6.

In the modified configuration information, a service A is divided into services A1 and A2. The service groups of services A1 and B are assigned to the original node group X and the service groups of service A2 and C are assigned to a new node group Z.

In the service group of the service A1, the states of nodes N1, N2 and N3 are set to Active, Standby1 and Standby2, respectively. In the service group of the service B, the states of nodes N1, N2 and N3 are set to Standby2, Active and Standby1, respectively.

In the service group of the service A2, the states of nodes N4, N5 and N6 are set to Active, Standby1 and Standby2, respectively. In the service group of the service C, the states of nodes N4, N5 and N6 are set to Standby2, Active and Standby1, respectively.

Thus, if a new node group is added instead of increasing the number of nodes in a node group, the number of target nodes for cluster control in each node group becomes the same as that before scale-out. Therefore, there is an advantage that a switching time is also the same as that before scale-out without increasing the amount of process of cluster control.

Next, a node failure determination method in a cluster system will be explained in detail with reference to FIGS. 7 through 19.

FIG. 7 illustrates a configuration example of a cluster system including client nodes which request a service process. This cluster system includes client nodes (service clients) CN1 and CN2 and nodes (service servers) N1-Nm, which are connected to each other by a communication network 701. A configuration management server, which is not illustrated in FIG. 7, is provided on the communication network 701.

A service group 702 is assigned to the nodes N1 through Nm and of these, the states of the node N1 and the nodes N2 through Nm are set to Active and Standby1 through Standby (m−1) respectively.

Each of service processes 711 and 712 in the client nodes CN1 and CN2 transmits a service packet requesting a service process to the node N1 through Nm via the communication network 701. Then, a node failure can be detected for each service group by checking responses from the nodes N1 through Nm each time.

Then, if a node failure is determined when the client node CN1 detects a failure in a node N1 (i=1, ..., m), a failure in the client node CN1 and a failure in the node N1 cannot be discriminated. Therefore, as illustrated in FIGS. 8 and 9, when a plurality of nodes detect a failure, it is determined to be a node failure.

Figure 8:
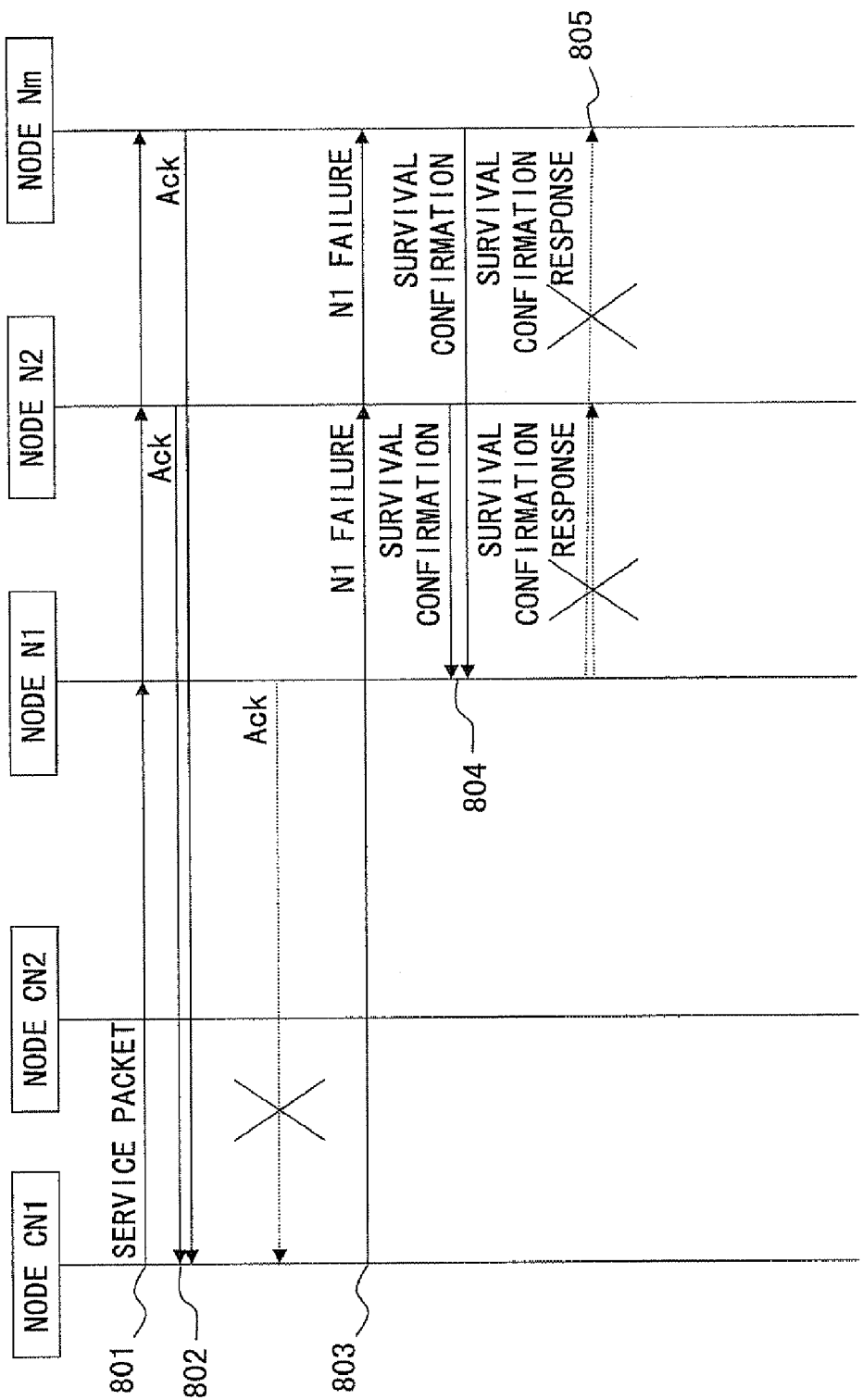
FIG. 8 illustrates sequence in the case where a node N1 has failed.
Figure 9:
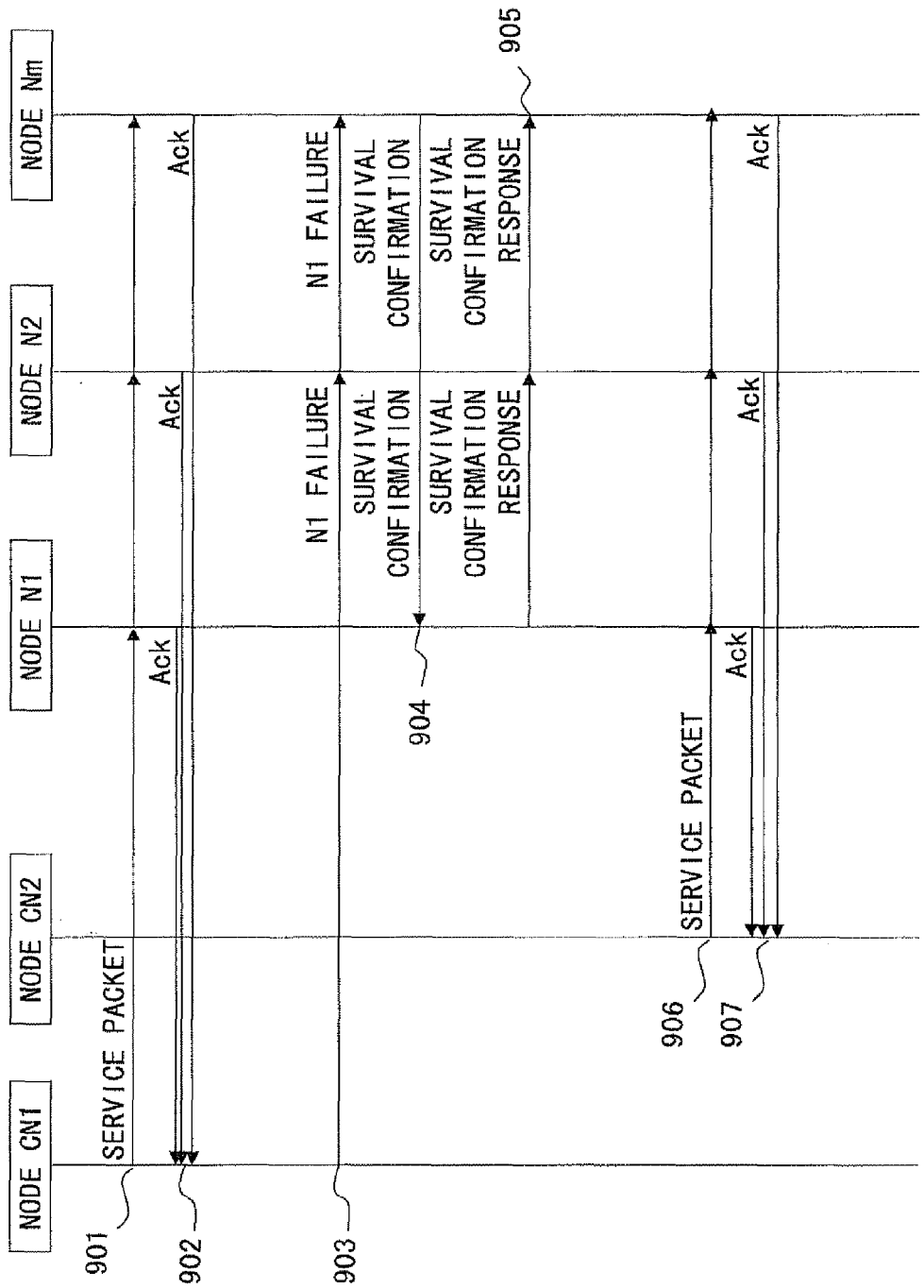
FIG. 9 illustrates sequence in the case where a client node CN1 has failed.

FIG. 8 illustrates sequence in the case where a node N1 has failed. The client node CN1 transmits a service packet to the nodes N1 through Nm (procedure 801) and checks whether a service response packet (Ack) is returned (procedure 802). If no service response packet is received from the node N1 within a certain time, it is determined that the node N1 has failed, a node failure detection packet is transmitted to the node N2 through Nm (procedure 803).

Upon receipt of the node failure detection packet, the nodes N2 through Nm transmit a survival confirmation packet being a kind of a service packet to the node N1 (procedure 804). If no survival confirmation response packet is received from the node N1 within a certain time, it is determined that the node N1 has failed and switching control is started (procedure 805).

Thus, when two or more nodes including itself detect a failure in the node N1, each of the nodes N2 through Nm determines that the node N1 has failed. More particularly, when the failure of the node N1 is confirmed by itself after a node failure detection packet indicating the failure of the node N1 is received from the client node CN1 or a node failure detection packet indicating the failure of the node N1 is further received from the other client node CN2 after the node failure detection packet from the client node CN1, it is determined that the node N1 has failed.

FIG. 9 illustrates sequence in the case where a client node CN1 has failed. The client node CN1 transmits a service packet to the nodes N1 through Nm (procedure 901) and checks whether a service response packet is returned (procedure 902). When the service response packet from the node N1 cannot be processed within a certain time due to the slow-down of the client node CN1, it is determined by mistake that the node N1 has failed and a node failure detection packet is transmitted to the nodes N2 through Nm (procedure 903).

Upon receipt of the node failure detection packet, the nodes N2 through Nm transmit a survival confirmation packet to the node N1 (procedure 904). Then, since a survival confirmation response packet is received from the node N1 within a certain time, it is determined that the node N1 is normal and switching control is not started. (procedure 905).

Then, the client node CN2 transmits a service packet to the nodes N1 through Nm (procedure 906) and receives a service response packet from the nodes N1 through Nm (procedure 907). Thus, the service operation can be continued from the client node CN2.

Such a node failure determination method has the following advantages compared with the conventional node failure detection method by a heart beat signal.

(1) Misdetection

A state in which a service cannot be continued can be detected more directly and accurately by sharing a service packet with a failure detection mechanism.

(2) Detection Time

If it is determined that the destination node has failed when a service packet is not processed within a certain time (for example, within three seconds), a node failure detection time that is more persuasive for a user can be set.

FIG. 10 illustrates a first timer management table provided for the client node CN1 and CN2. In this timer management table, the information of a timer TMR1 for managing the reception of a service response packet is recorded for each service group ID. In this example, a timer value of five seconds is set for the service group of a service A and no timer is set for the service group of a service B.

FIG. 11 illustrates a second timer management table provided for nodes N1 through Nm. In this timer management table, the information of a timer TMR2 for managing the reception of a survival confirmation response packet is recorded for each service group ID. In this example, a timer value of five seconds is set for the service group of a service A and no timer is set for the service group of a service B.

The timer values set in the timer management tables illustrated in FIGS. 10 and 11 are decremented at certain intervals.

FIG. 12 illustrates a failure node list provided for nodes N1 through Nm. In this failure node list, the combination of a service group ID, a failure node ID and a detection source client node ID is recorded. In this example, a node N1 is recorded as a failure node against the service group of a service A and a client node CN1 is recorded as a detection source client node.

FIGS. 13 and 14 illustrate the formats of a service packet and a service response packet, respectively. The service packet illustrated in FIG. 13 includes a packet ID, a service group ID, a sequence number, data and a transmitting source node ID, and the service response packet illustrated in FIG. 14 includes a packet ID indicating a response, a service group ID, a sequence number and a response node ID.

FIGS. 15 and 16 illustrate the formats of a survival confirmation packet and a survival confirmation response packet, respectively. The survival confirmation packet illustrated in FIG. 15 includes a packet ID indicating survival confirmation, a service group ID, a sequence number and a confirmation request source node ID, and the survival confirmation response packet illustrated in FIG. 16 includes a packet ID indicating a survival confirmation response, a service group ID, a sequence number and a response node ID.

FIG. 17 illustrates the format of a node failure detection packet. The node failure detection packet illustrated in FIG. 17 includes a packet ID indicating node failure detection, a service group ID, a sequence number and a detection source node ID and a failure node ID.

Figure 18:
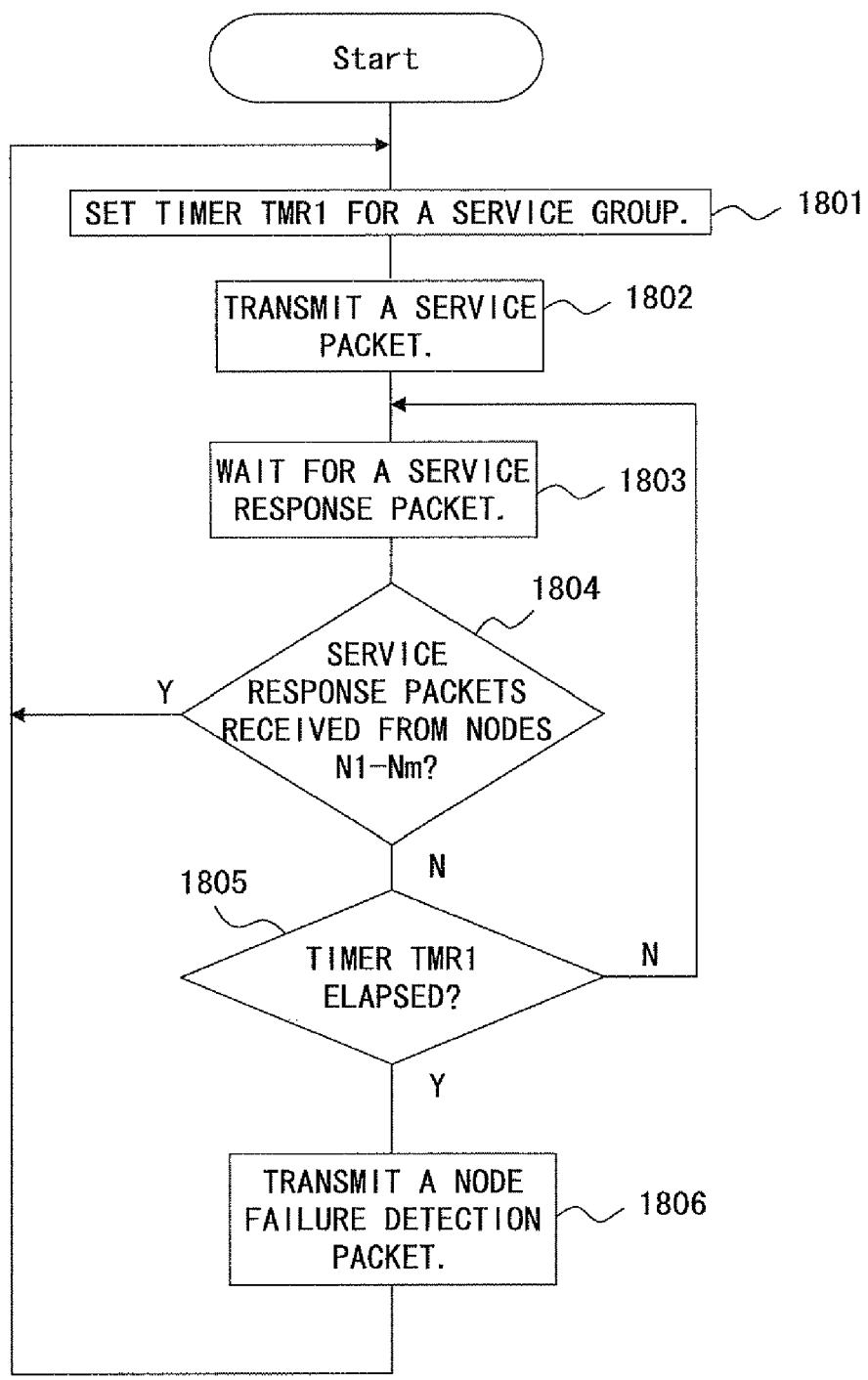
FIG. 18 is a flowchart of a node failure detection process.

FIG. 18 is a flowchart of a node failure detection process in a client node. This process is performed for each service group on the basis of a service ID.

A client node firstly sets the timer value of the timer TMR1 for a process target service group (step 1801) and transmits a service packet to nodes N1 through Nm (step 1802). Then, the client node performs the reception waiting process of a service response packet (step 1803) and checks whether service response packets are received from all of the nodes N1 through Nm (step 1804).

When receiving no service response packet from any of the nodes, the client node checks whether a timer TMR1 has elapsed (a timer value is 0), referring to a timer management table (step 1805). If the timer TMR1 has not elapsed yet, the client node repeats the processes in steps 1803 and after.

If the timer TMR1 has elapsed, the client node regards that a node from which no service response packet is returned has failed and transmits a node failure detection packet to the nodes other than it (step 1806). Then, the client node repeats the processes in steps 1801 and after. If in step 1804 the client node receives service response packets from all the nodes, it regards that all the nodes are normal and repeats the processes in steps 1801 and after.

Figure 19:
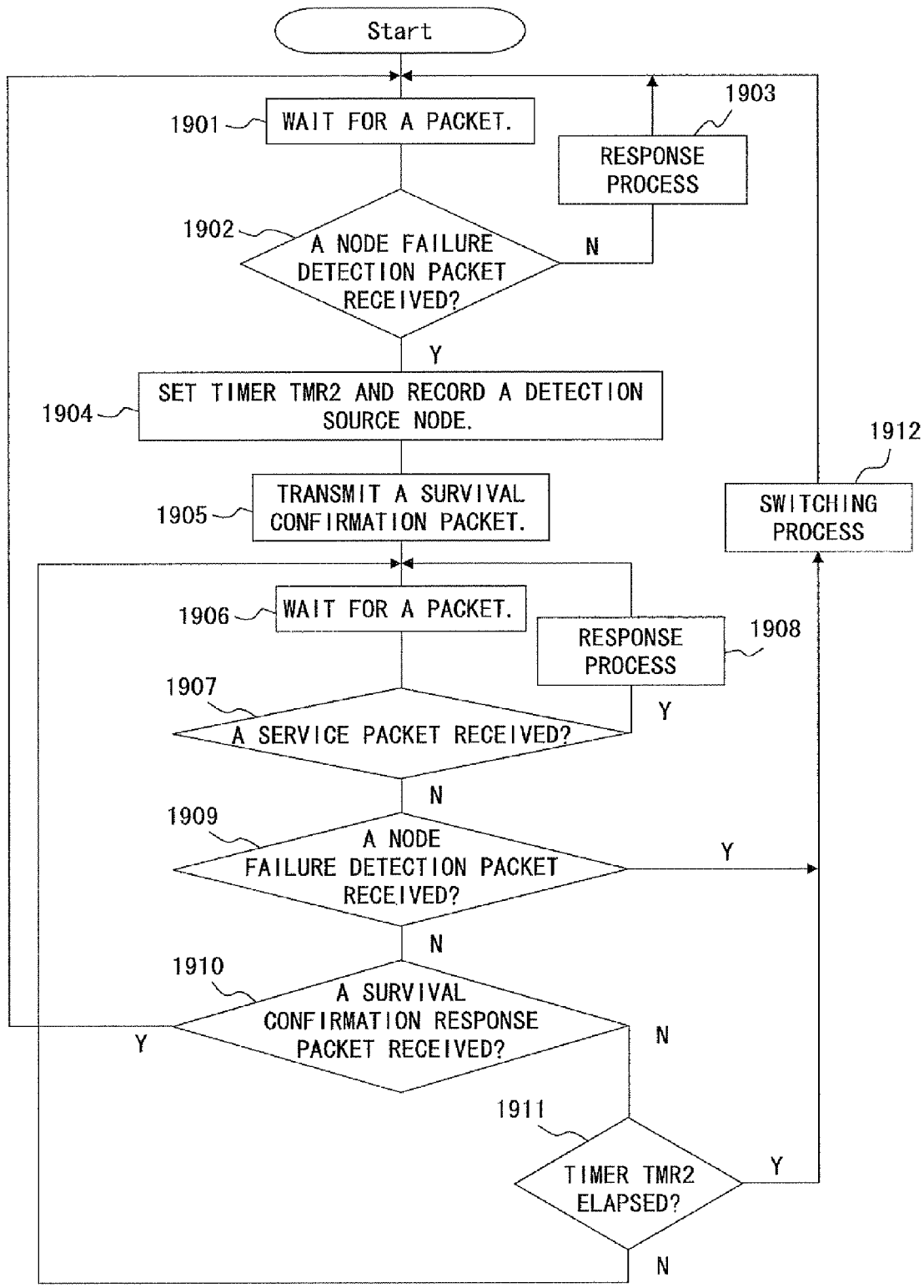
FIG. 19 is a flowchart of a node failure determination process.

FIG. 19 is a flowchart of a node failure determination process by the cluster control unit of a node N1. This process is also performed for each service group on the basis of a service group ID.

The cluster control unit firstly performs a packet reception waiting process (step 1901) and checks whether a node failure detection packet is received (step 1902).

Upon receipt of a node failure detection packet, the cluster control unit sets the timer value of the timer TMR2 for the service group in a timer management table and records a service group ID, a failure node ID and a detection source client node ID in a failure node list (step 1904). Then, the cluster control unit transmits a survival confirmation packet to the failed node (step 1905). At this moment, since there is still a possibility that it is the failure of the client node, a switching process is not performed yet.

When receiving no node failure detection packet in step 1902, the cluster control unit performs a response process (step 1903) repeats the processes in steps 1901 and after. In this response process, the cluster control unit checks whether it has received a service packet (including a survival confirmation packet) and returns a service response packet or a survival confirmation response packet if it has received a service packet.

After in step 1905, transmitting a survival confirmation packet, the cluster control unit performs a packet reception waiting process (step 1906) and checks whether it has received a service packet (1907). If it has received a service packet, the cluster control unit performs the same response process as in step 1903 and repeats the processes in steps 1906 and after.

If it has received no service packet, then the cluster control unit checks whether it has received a node failure detection packet having the same service group ID and failure node ID from another detection source node while referring to the failure node list (step 1909).

When such a node failure detection packet has been received, it is found that the failure of the same node has been detected by two client nodes. Then, the cluster control unit determines the node failure corresponding to the failure node ID and performs a switching process (step 1912). Then, the cluster control unit repeats the processes in steps 1901 and after. In step 1912 a switching process for each node or each service group is performed.

If it has received no node failure detection packet, then the cluster control unit checks whether it has received a survival confirmation response packet (step 1910). If it receives a survival confirmation response packet, the cluster control unit regards that the destination node of the survival confirmation packet is normal and repeats the processes in steps 1901 and after.

If it has received no survival confirmation response packet, the cluster control unit checks whether the timer TMR2 has elapsed, referring to the timer management table (step 1911). If the timer TMR2 has not elapsed yet, the cluster control unit repeats the processes in steps 1906 and after.

If the timer TMR2 has elapsed, the cluster control unit regards that the destination node of the survival confirmation packet has failed and at that moment it is found that the failure of the same node has been detected by the client node and the node Ni. Then, the cluster control unit determines the node failure and performs a switching process (step 1912). Then, the cluster control unit repeats the processes in steps 1901 and after.

However, in the above-described node failure determination method, when the node N1 fails, a node failure detection packet is transmitted for each service group and a survival confirmation process (the transmission/reception of a survival confirmation packet/a survival confirmation response packet) is performed for each service group.

Figure 20:
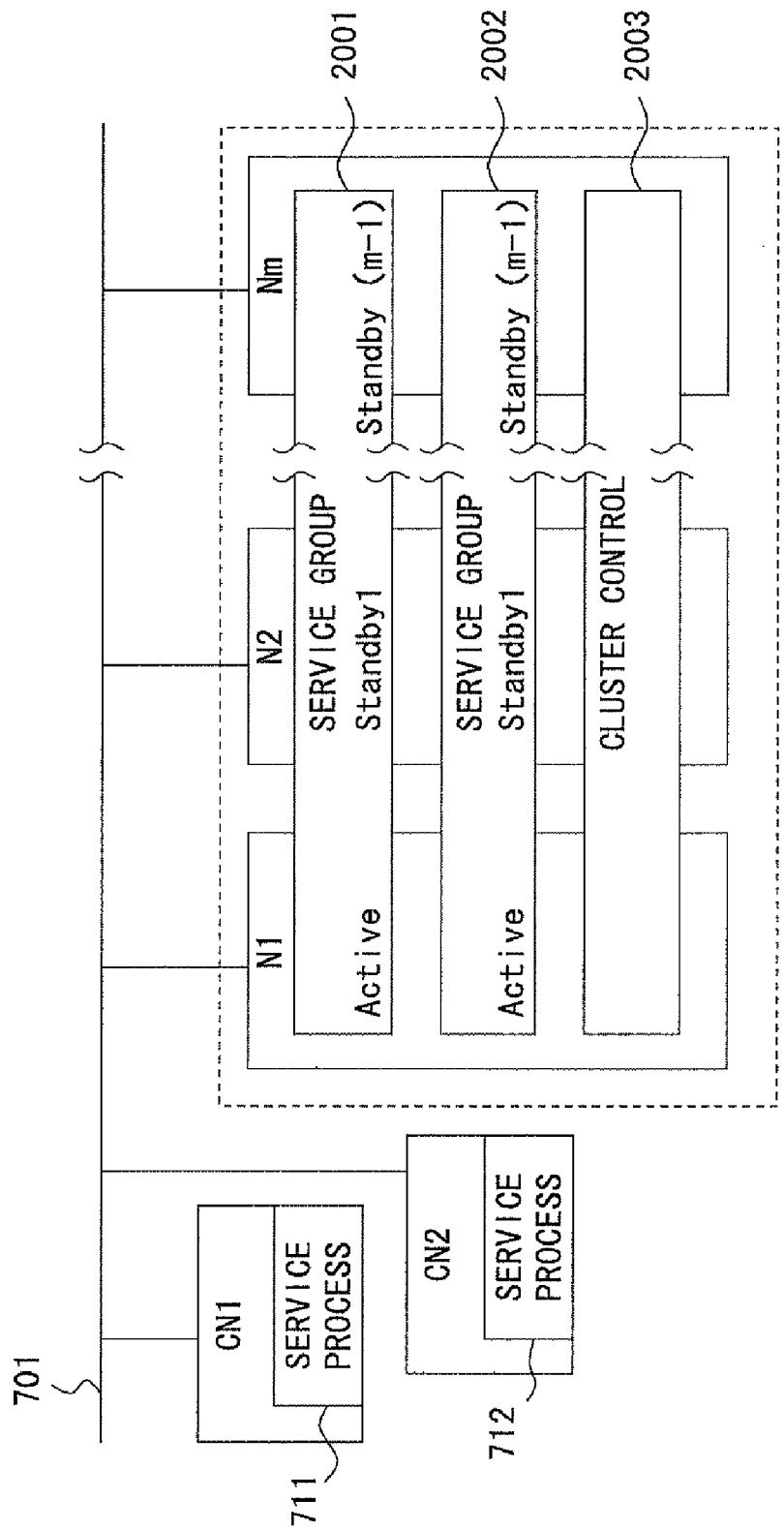
FIG. 20 illustrates a plurality of service groups in a cluster system.

Therefore, as illustrated in FIG. 20, when cluster control 2003 is applied to two service groups 2001 and 2002, a node failure detection packet is transmitted to both the service groups in duplication, accompanying the failure of the node N1. Therefore, in the cluster control 2003, it is necessary to perform a survival confirmation process between the node N1 and the other nodes N2 through Nm in duplication.

In this case, a time needed for a survival confirmation process increases in proportion to the number of service groups in operation. Especially, when a failure occurs in an OS layer or the like, failures are detected in all service groups in the node. Therefore, the same number of survival confirmation processes as service groups are performed in duplication, which is inefficient.

Therefore, when a node failure is determined in two or more service groups in the same node, it is preferable to regard that it is a failure of the node itself and to perform switching for each node. According to this switching method, after switching is performed for each node once, the survival confirmation processes and switching processes of the other service groups are suppressed. Therefore, in a cluster system having a plurality of service groups too, a switching process can be performed in high speed regardless of the number of service groups.

Figure 21:
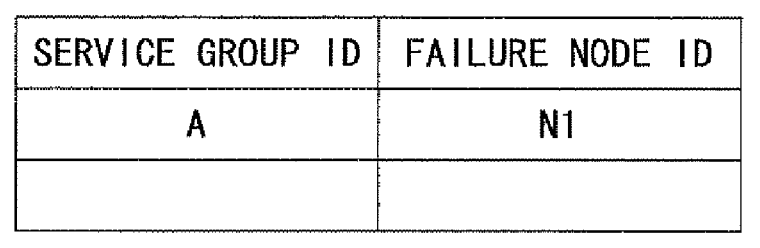

In this case, besides the above-described timer management table and failure node list, a node failure determination list as illustrated in FIG. 21 is provided for node N1 through Nm. When a switching process has been performed for each service group, the combination of the service group ID and failure node ID is recorded in this node failure confirmation list. In this example, as to the service group of service A, node N1 is recorded as a failure node.

Figure 22:
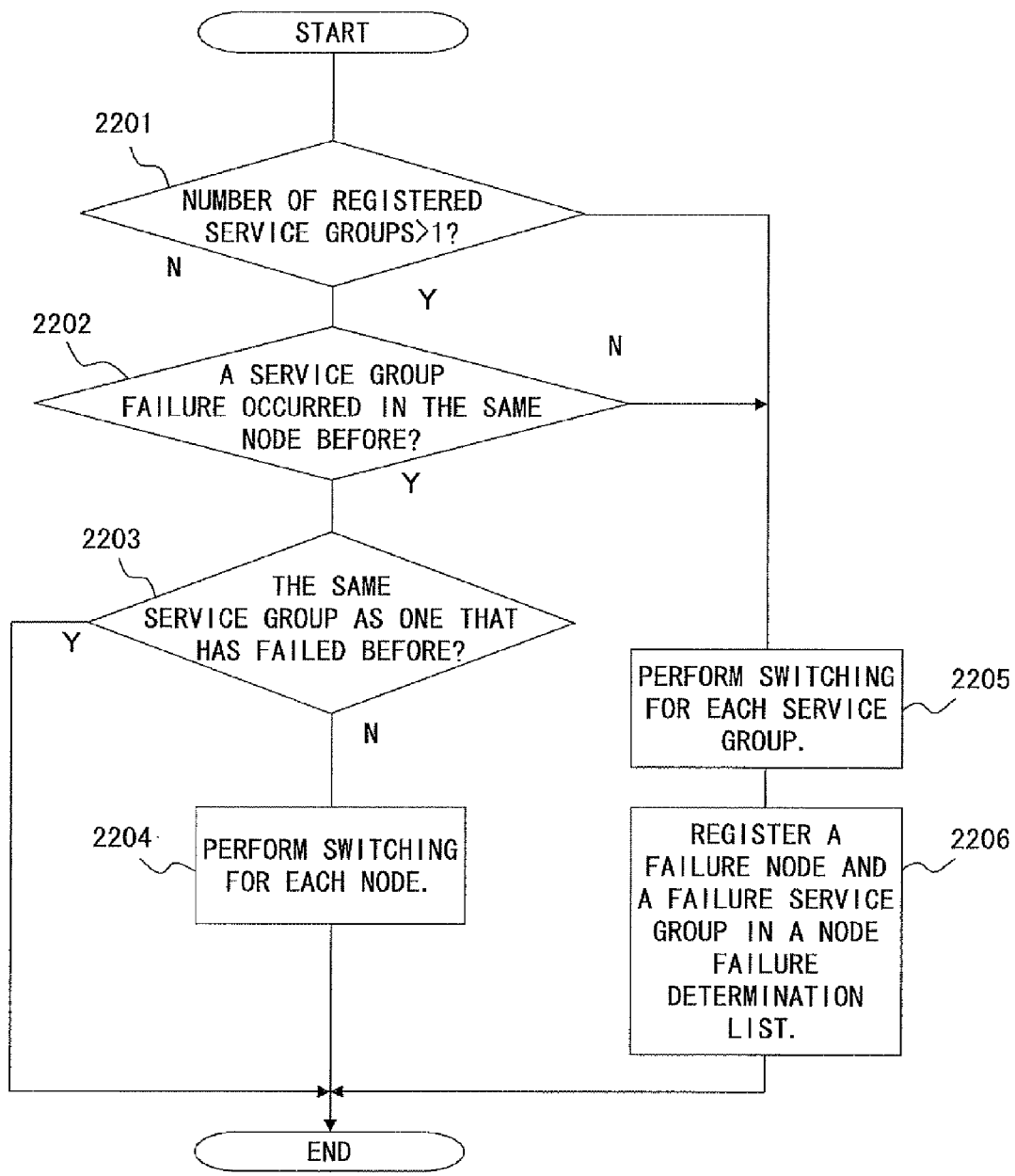
FIG. 22 is a flowchart of a switching process.

A node failure detection process in a client node and the node failure determination process by the cluster control unit of node N1 are similar to those illustrated in FIGS. 18 and 19, respectively. However, in step 1912 of FIG. 19, a switching process as illustrated in FIG. 22 is performed.

The cluster control unit of node N1 firstly checks whether a plurality of service groups is registered in a node group to which the node N1 belongs, referring to configuration information (step 2201). If only a single service group is registered, the cluster control unit performs switching for each service group (step 2205) and records the service group ID and the failure node ID in the node failure determination list (step 2206). In step 2205 the cluster control unit transmits an off-line switching instruction for each service group to the cluster control unit of the failure node.

If in step 2201 a plurality of service groups are registered, then the cluster control unit checks whether the failure of a service group has occurred in the same node before, referring to the failure node list and the node failure determination list (step 2202).

If the failure node ID of the failure node list is not recorded in the node failure determination list, it is found that a new node has failed. Then, the cluster control unit performs switching for each service group (step 2205) and records the service group ID and the failure node ID in the node failure determination list (step 2206).

If in step 2202 the failure node ID of the failure node list is recorded in the node failure determination list, it is found that the same node has failed before. Then, the cluster control unit checks whether the same failure has occurred before has occurred in the same service group (step 2203).

If as to the same failure node ID, the service group ID in the failure node list and the service group ID in the node failure determination list all are the same, it is found that the same service group has failed. In this case, since it is the failure of a single service group and switching for each service group has already been performed, the cluster control unit terminates the process without performing switching.

If in step 2203 it is not the failure of the same service group, node failures are determined in a plurality of different service groups in the same node. Therefore, the cluster control unit performs switching for each node (step 2204). Thus, the switching of all the service groups in the node is collectively performed.

Next, switching for each service group in a cluster system illustrated in FIG. 23 will be explained. In this cluster system, a node failure determination process is applied to a service group 2301 by the cluster control units 2321 through 2323 of nodes N1 through N3. In this example, the states of the service processes 2311, 2312 and 2313 of the nodes N1, N2 and N3 are set to Active, Standby1 and Standby2, respectively.

Figure 24:
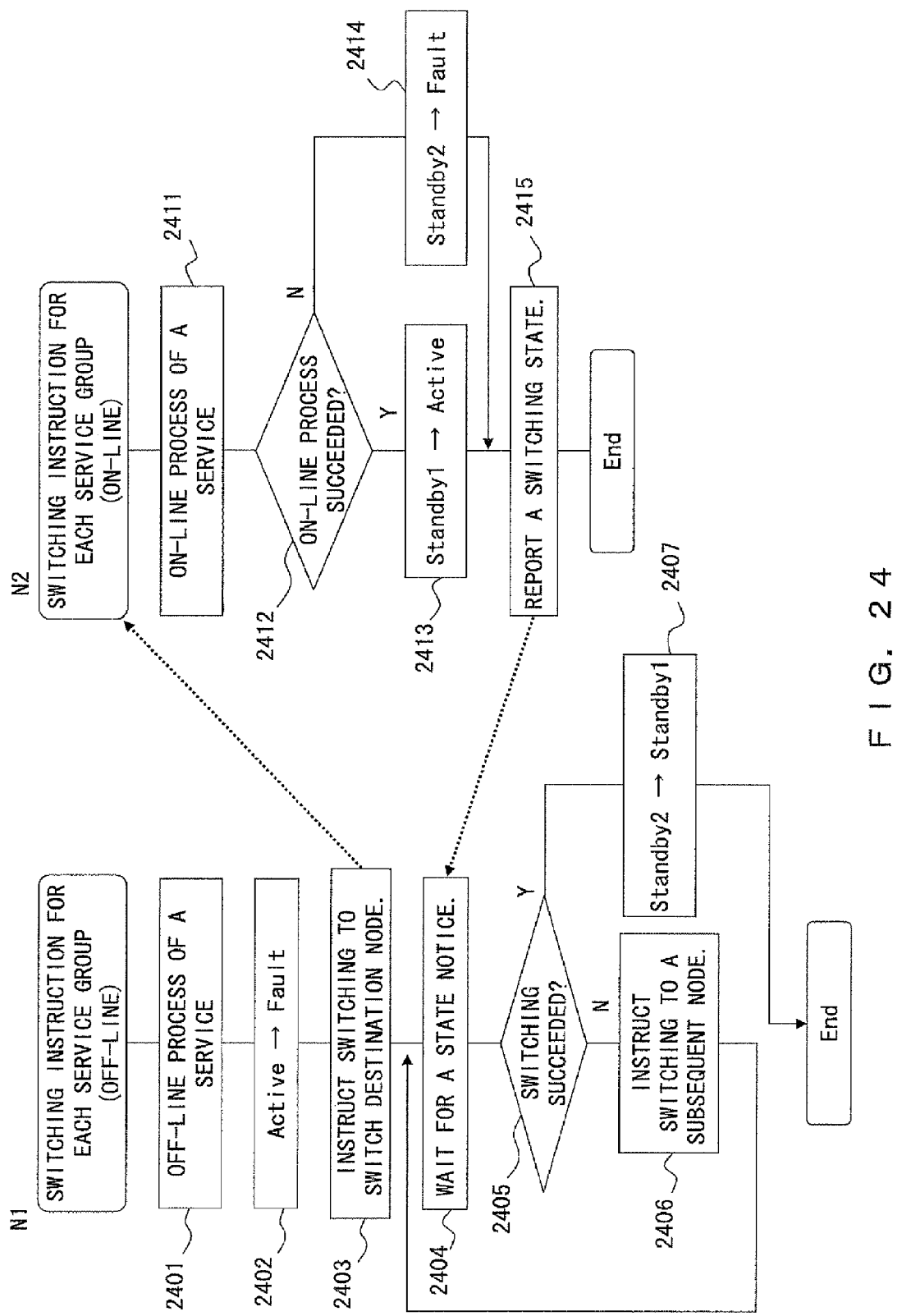
FIG. 24 is a flowchart of the switching process in units of service group.

When detecting the failure of the service process of the node N1 in operation of the service group 2301, the cluster control units 2322 and 2323 transmit off-line switching instructions for each service group to the cluster control unit 2321. In this example, the cluster control units 2321 and 2322 perform switching processes as illustrated in FIG. 24.

The cluster control unit 2321 firstly performs an off-line process for the service (step 2401) and modifies the state of the service process 2311 from Active to Fault in configuration information (step 2402). Fault indicates a service group failure state. It is assumed that the modification of the state of each service process is reflected in the configuration information of all the nodes N1 through N3 by the cluster control units 2321 through 2323.

Then, the cluster control unit 2321 determines a switching destination node referring to configuration information and transmits an on-line switching instruction to the cluster control unit of the node (step 2403). Then, the cluster control unit 2321 performs a state notice waiting process (step 2404). In this example, the node N2 having the service process 2312 whose state is set to Standby1 is determined as a switching destination node and a switching instruction is transmitted to the cluster control unit 2322.

The cluster control unit 2322 performs the on-line process of the service according to the switching instruction (step 2411) and checks whether the process has succeeded (step 2412). If it has succeeded, the cluster control unit 2322 modifies the state of the service process 2312 from Standby1 to Active in configuration information (step 2413). If it has failed, the cluster control unit 2322 modifies the state from Standby1 to Fault (step 2414). Then, the cluster control unit 2322 notified the cluster control unit 2321 of the state after modification (step 2415).

The cluster control unit 2321 checks whether the switching has succeeded, on the basis of the reported state (step 2405). If the state is Active, the cluster control unit 2321 determines that it has succeeded and modifies the state of the service process 2313 from Standby2 to Standby1 in configuration information (step 2407).

If the reported state is Fault, the cluster control unit 2321 determines that it has failed. Then, the cluster control unit 2321 determines the node 3 having the service process 2313 whose state is set to Standby2 as a subsequent switching destination node and transmits a switching instruction to the cluster control unit 2323. Then, the cluster control unit 2321 repeats the processes in steps 2404 and after.

Figure 25:
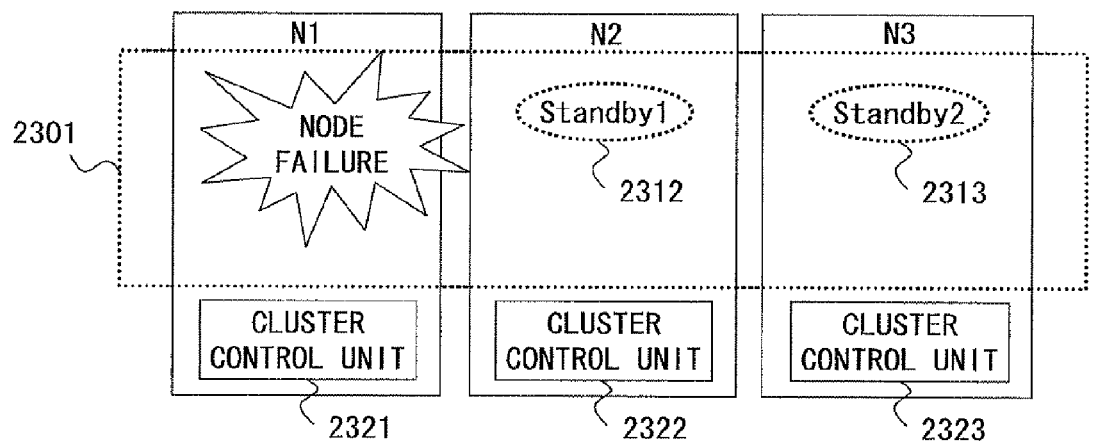
FIG. 25 illustrates the switching in units of node.
Figure 26:
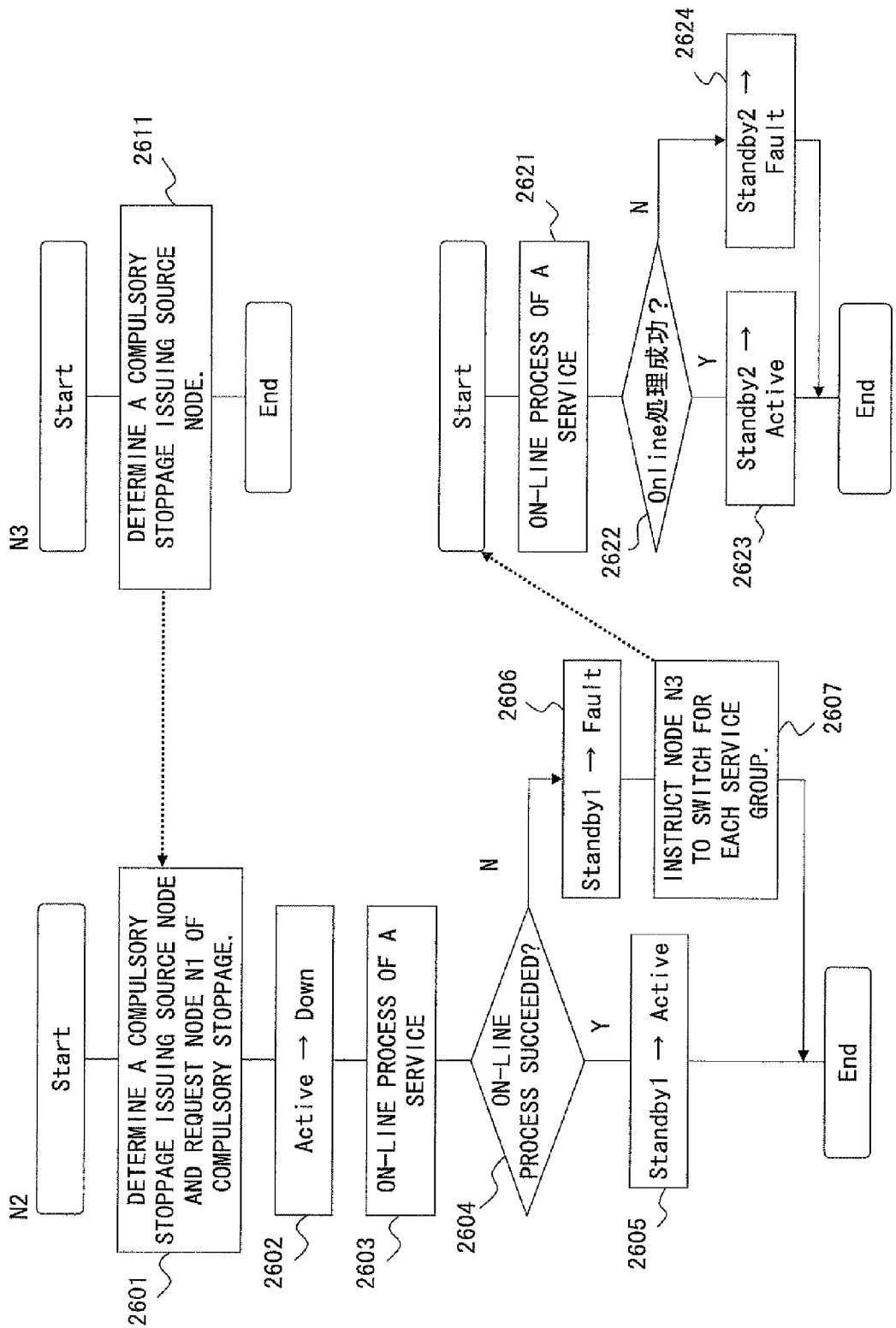
FIG. 26 is a flowchart of the switching process in units of node.

Next, the switching for each node in the case where node N1 fails, as illustrated in FIG. 25 will be explained. In this case, when detecting the failure of the node N1, the cluster control units 2322 and 2323 perform switching processes illustrated in FIG. 26 in step 2205 of FIG. 22.

The cluster control units 2322 and 2323 firstly determine a compulsory stoppage issuing source node referring to configuration information and transmit a compulsory stoppage request from the node to the node N1 (steps 2601 and 2611). In this example, the node N2 having the service process 2312 whose state is set to Standby1 is determined as a compulsory stoppage issuing source node and a compulsory stoppage instruction is transmitted from the cluster control unit 2322 to the cluster control unit 2321.

Then, the cluster control unit 2322 modifies the state of the service process 2311 from Active to Down in configuration information (step 2602). Then, the cluster control unit 2322 performs the on-line process of the service (step 2603) and checks whether the process has succeeded (step 2604). If it has succeeded, the cluster control unit 2322 modifies the state of the service process 2312 from Standby1 to Active (step 2605).

If it has failed, the cluster control unit 2322 modifies the state of the service process 2312 from Standby1 to Fault (step 2606) and transmits an on-line switching instruction for each service group to the cluster control unit 2323 (step 2607).

The cluster control unit 2323 performs the on-line process of the service according to the switching instruction (step 2621) and checks whether the process has succeeded (step 2622). If it has succeeded, the cluster control unit 2323 modifies the state of the service process 2313 from Standby2 to Active (step 2623). If it has failed, the cluster control unit 2323 modifies the state from Standby2 to Fault (step 2624).

Configuration information stored in a configuration management server specifies an initial state at the starting time of a service and is never affected by switching in an operation of a service. Therefore, although configuration information in the node group is modified by the switching for each service group or node, the configuration information of the configuration management server is not modified.

In the above-described node failure determination process illustrated in FIG. 19, when two nodes detect the same node failure, the node failure is determined. Instead, a node failure may also be determined when the node failure is detected by K (K≧3) nodes.

In the above-described switching process illustrated in FIG. 22, when the node failure is determined for two different service groups in the same node, switching for each node is performed. Instead, switching for each node may also be performed when the node failure is determined for K (K≧3) service groups.

The above-described configuration management server 101, client nodes CN1 and CN2 and nodes N1 through Nm can be constituted, for example, using an information processing device (computer) as illustrated in FIG. 27. The information processing device illustrated in FIG. 27 includes a CPU (central processing unit) 2701, a memory 2702, an external storage device 2703 and a network connection device 2704, which are connected to each other by a bus 2705.

The memory 2702 includes, for example, ROM (read-only memory) RAM (random-access memory) and the like, and stores programs and data used for the process. The CPU 2701 performs the above-described service process, cluster control and the like, by executing the programs using the memory 2702.

In this case, the timer management table illustrated in FIGS. 10 and 11, the failure node list illustrated in FIG. 12 and the node failure determination list illustrated in FIG. 21 are stored in the memory 2702 as control data, and the cluster control units 2321 through 2323 illustrated in FIG. 23 are stored in the memory 2702 as a control programs.

The external storage device 2703 is, for example, a magnetic disk device, an optical disk device, a magneto-optical device, a tape device or the like. The information processing device stores the programs and data in this external storage device 2703 and uses them by loading them onto the memory 2702, if necessary.

The network connection device 2704 is connected to a communication network, such as a LAN (local area network) or the like, and performs data conversion accompanying communications. Furthermore, the information processing device receives the programs and data from an external device via the network connection device 2704 and uses them by loading them on to the memory 2702, if necessary.

Figure 28:
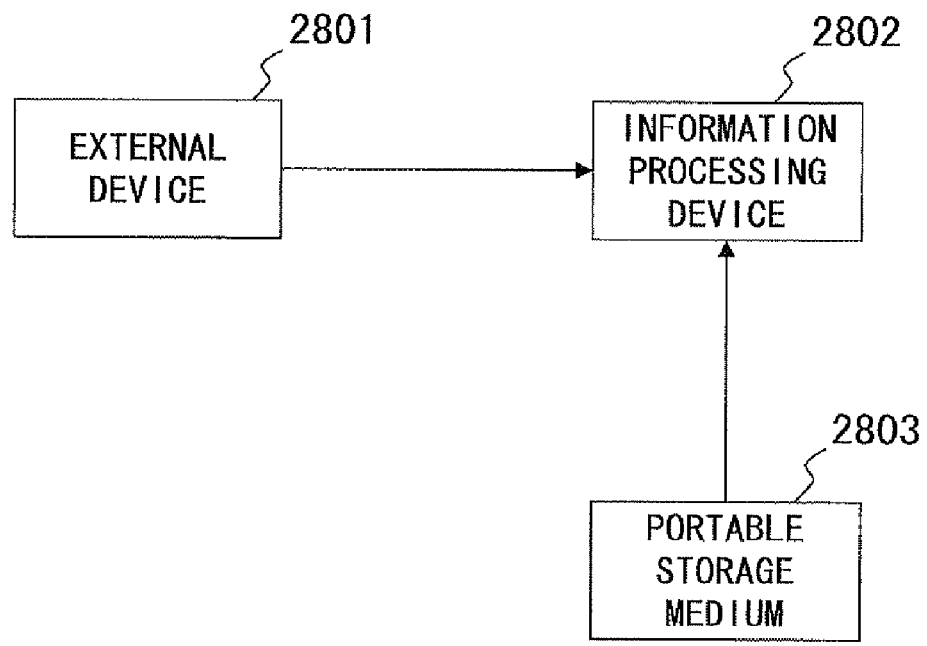
FIG. 28 illustrates how to provide programs and data.

FIG. 28 illustrates how to provide the information processing device illustrated in FIG. 27 with programs and data. The programs and data stored in an external device 2801 or a portable storage medium 2803 are loaded onto the memory 2702 of the information processing device 2802. The external device 2801 generates a carrier signal for carrying the programs and data and transmits them to the information processing device 2802 via an arbitrary transmission medium on a communication network. The CPU 2701 performs the above-described service process, cluster control and the like by executing the programs using the data.

What is claimed is:

1. A cluster system including a plurality of client node devices and a plurality of server node devices, wherein:
   a first client node device of the plurality of client node devices transmits a service process request to a first service server node device of the plurality of server node devices and transmits failure detection information to a second server node device of the plurality of server node devices when the first client node device does not receive a service response from the first service server node device, and
   the second server node device transmits a survival confirmation request to the first server node device when the second server node device receives the failure detection information, determines that the first server node device has failed in both of a first case where the second server node device does not receive a survival confirmation response from the first server node device in a certain time period after transmitting the survival confirmation request and a second case where the second server node device receives further failure detection information from a second client node device of the plurality of client node devices in the certain time period after transmitting the survival confirmation request, and starts switching control of a server node device which performs a service process.

2. A node switching method in a cluster system including a plurality of client node devices and a plurality of server node devices, the method comprising:
   transmitting a service process request from a first client node device of the plurality of client node devices to a first service server node device of the plurality of server node devices;
   transmitting failure detection information from the first client node device to a second server node device of the plurality of server node devices when the first client node device does not receive a service response from the first service server node device;
   transmitting a survival confirmation request from the second server node device to the first server node device when the second server node device receives the failure detection information;
   determining that the first server node device has failed in both of a first case where the second server node device does not receive a survival confirmation response from the first server node device in a certain time period after transmitting the survival confirmation request and a second case where the second server node device receives further failure detection information from a second client node device of the plurality of client node devices in the certain time period after transmitting the survival confirmation request; and
   starting switching control of a server node device which performs a service process.

3. The node switching method according to claim 2, wherein:
   the second server node device checks how many service groups including an active service process in the first server node device and a standby service process in another server node device are assigned to a node group including the first server node device and another server node device and performs switching for each service group when a single service group is assigned to the node group.

4. The node switching method according to claim 2, wherein:
   the second server node device checks how many service groups including an active service process in the first server node device and a standby service process in another server node device are assigned to a node group including the first server node device and another server node device and performs switching for each node when a plurality of service groups are assigned to the node group and the first server node device has failed in a prescribed number or more of service groups of the plurality of service groups.

5. The node switching method according to claim 2, wherein:

the second server node device checks how many service groups including an active service process in the first server node device and a standby service process in another server node device are assigned to a node group including the first server node device and another server node device and performs switching for each service group when a plurality of service groups are assigned to the node group and the first server node device has failed in a single service group of the plurality of service groups.

* * * * *